UNITED STATES PATENT OFFICE.

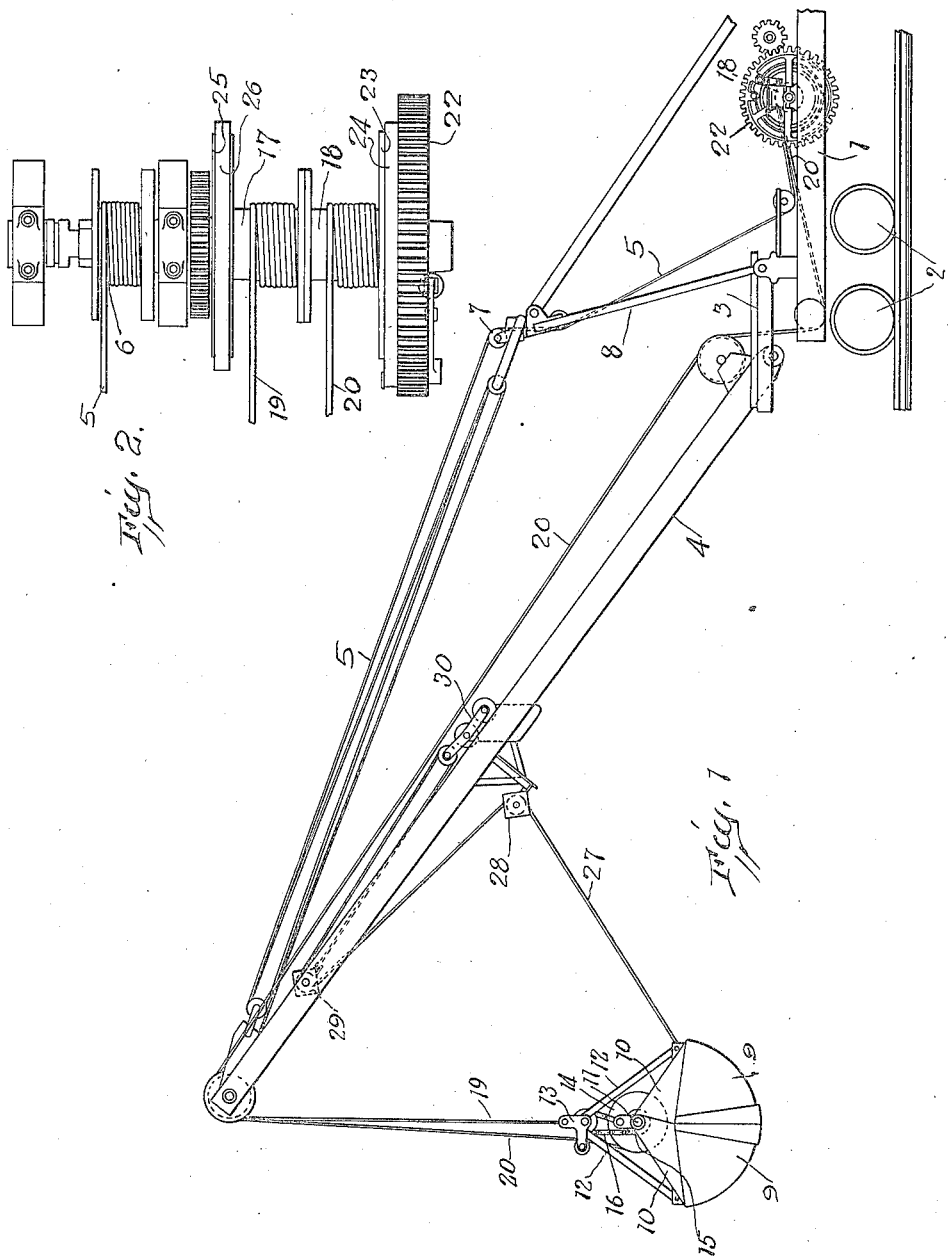

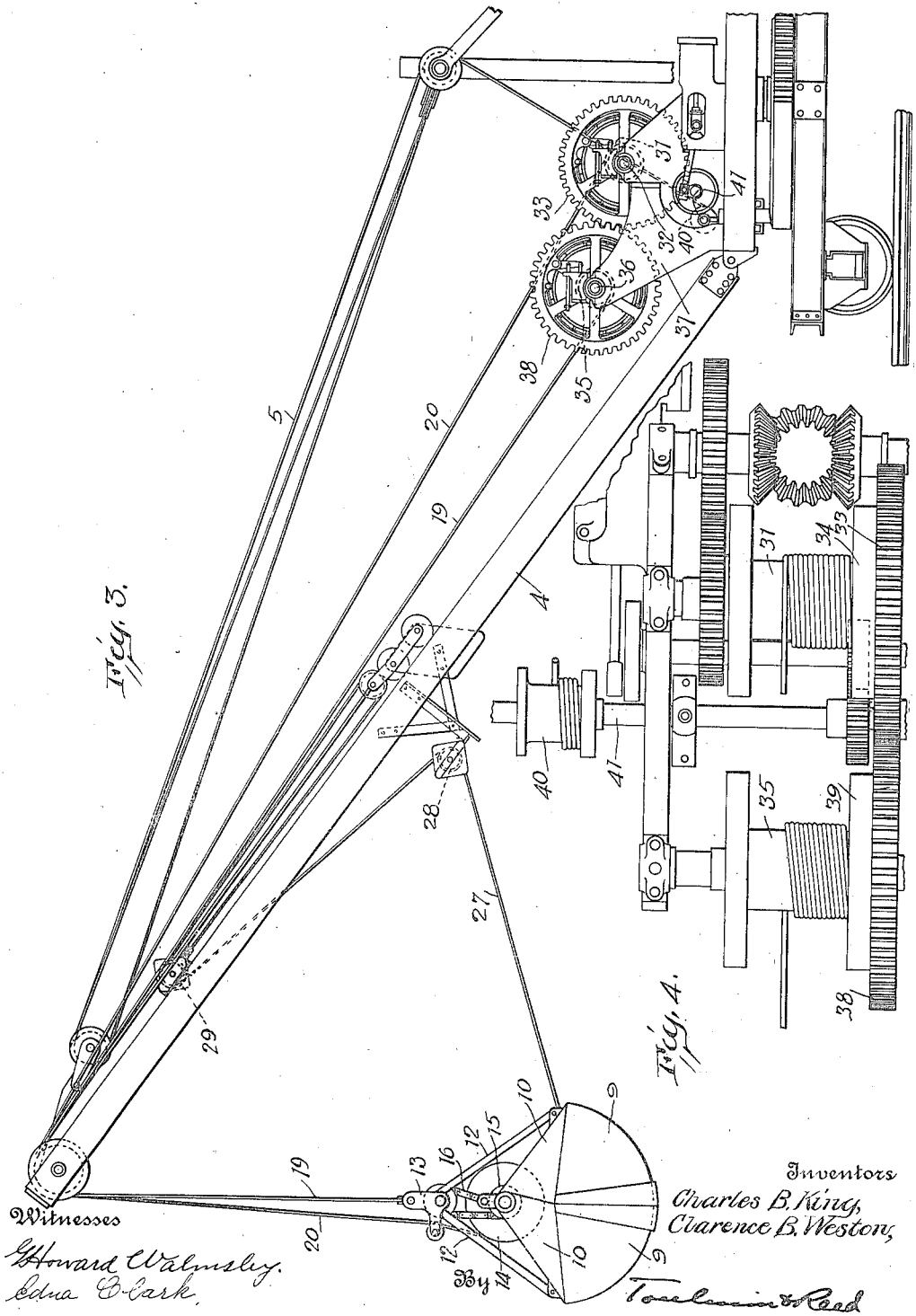

CHARLES B. KING AND CLARENCE B. WESTON, OF MARION, OHIO, ASSIGNORS TO THE MARION STEAM SHOVEL COMPANY, OF MARION, OHIO, A CORPORATION OF OHIO.

EXCAVATING-MACHINE.

1,164,652.     Specification of Letters Patent.     Patented Dec. 21, 1915.

Application filed August 7, 1911. Serial No. 642,621.

*To all whom it may concern:*

Be it known that we, CHARLES B. KING and CLARENCE B. WESTON, citizens of the United States, residing at Marion, in the county of Marion and State of Ohio, have invented certain new and useful Improvements in Excavating-Machines, of which the following is a specification, reference being had therein to the accompanying drawing.

This invention relates to excavating machines, and the object of the same is to provide an attachment for an ordinary steam shovel which will enable excavating buckets of the clam shell type to be used with a steam shovel without material alteration thereof.

In the accompanying drawings, Figure 1 is a side elevation of a standard steam shovel showing the invention applied thereto; Fig. 2 is a plan view of the drums forming a part of the attachment; Fig. 3 is a side elevation of a steam shovel of a different type showing the invention applied thereto in a slightly modified form, and Fig. 4 is a top plan view of the mechanism shown in Fig. 3.

In these drawings we have shown the invention as applied to excavating machines of two types, in each of which the main features of construction are the same. In Figs. 1 and 2 we have shown the invention as applied to a steam shovel of the standard type which comprises a main frame 1 mounted on trucks 2 and provided at its forward end with a turn-table 3 on which is mounted a boom 4. In the present instance we have shown this turn-table as provided with a special form of boom adapted particularly for use in connection with the attachment of the invention, but it will be obvious that the ordinary steam shovel boom or any other suitable boom can be mounted on this turntable. The boom is pivotally supported on the turn-table and its outer end can be elevated and lowered by suitable hoisting mechanism which is here shown as comprising a cable 5 having one end wound upon a hoisting drum 6, extending about a suitable guide 7 at the upper end of an A-frame 8 and connected with the boom near its outer end.

Excavating buckets of the clam shell type comprise two or more movable jaws and suitable mechanism is provided to close these jaws in such a manner as to cause them to dig into the material on which they rest and remove a portion of that material, which is retained in the bucket. In the present drawings we have illustrated an ordinary clam shell bucket comprising two jaws 9 provided at their inner and upper edges with upwardly extending arms 10 pivotally mounted upon a common shaft 11. The outer edge of each jaw 9 is connected by one or more rods 12 with a supporting member or head 13. Mounted on the shaft 11, to which the jaws 9 are pivoted, is a differential drum, the larger portion, 14, of which is actuated by means of a suitable cable and the smaller portion, 15, of which is connected to one end of a chain 16, the opposite end of which passes about the head 13 and is connected with the shaft 11. The different types of buckets contain more or less mechanism, but the elements described are the ones essential to the operation of an excavating mechanism of this character.

The operation of the bucket is well understood. It is lowered in its open position, that is, with the jaws widely separated. When it rests upon the material to be excavated in its open position the differential drum is actuated by means of a cable and the chain 16 caused to wind about the smaller portion of the differential drum, thus drawing the inner corners of the jaws toward the head 13, and, consequently, causing the jaws to move into their closed position without altering the vertical position of the bucket.

To enable an excavating bucket of this character to be used with the ordinary steam shovel or a similar excavating mechanism we have mounted upon the frame 1 two drums 17 and 18 and have connected with the respective drums two cables 19 and 20. The cable 20 is connected with the larger portion 14 of the differential drum of the excavating mechanism, while the other cable is connected with the supporting member or head 13, both cables extending about the guides or sheaves at the outer end of the boom. The drums 17 and 18 may be supported upon the frame of the excavating machine in any suitable manner and may be arranged in any suitable positions. Preferably, however, the drums are so connected one with the other that they can be caused to move in unison or can be controlled separately to enable the cables to be manipulated as desired. In that form of the device shown in Figs. 1 and 2 we have mounted both the drums 17 and 18 on a common shaft 21, to which movement is imparted through a gear 22 from the usual source of power for actuating the hoisting drum for the boom. The drum 18 is loosely mounted on the shaft 21 and has at that end thereof adjacent to the gear 22 a friction member 23 about which extends a friction band 24 connected at its opposite ends with the gear 22. Suitable operating mechanism, such as a steam operated ram of a well known construction, is mounted on the gear for controlling the friction band 24 and connecting the drum 18 with and disconnecting the same from the driving mechanism. The drum 17 is also loosely mounted on the shaft 21 and is provided at one end with a friction member 25 about which extends a brake band 26 which may be actuated in any suitable manner, as by the usual foot lever which is not here shown. The two drums are connected one to the other in such a manner as to cause them to rotate in unison but this connection is of such a character that one drum can be rotated independently of the other. As here shown the connection is a frictional one and comprises rings of frictional material secured to the adjacent ends of the respective drums and held in operative engagement with each other. In the present instance we have shown the boom hoisting drum 6 as mounted on the shaft 21 beyond the drums 17 and 18, thereby enabling these three drums to be actuated through a single actuating mechanism.

In the operation of the device the drum 17 constitutes the lowering and dumping drum which controls the cable 19, which, in turn, is connected with the supporting member 13 for the excavating bucket. The drum 18 constitutes the closing and hoisting drum and controls the cable 20 which is connected to the operating mechanism of the excavating bucket. After the bucket has been dumped both drums are rotated and the cables 19 and 20 slacked off to permit the bucket to drop in its open position on the material to be excavated. This may be accomplished by actuating the ram to release the friction clutch mechanism 24 and permit the bucket to move downward by gravity. When the bucket is in position on the work the brake is set on the drum 17 to hold it against movement and the drum 18 is actuated to close the jaws of the bucket. When these jaws are closed the brake on the drum 17 is released and both drums are rotated, the drum 18 and cable 20 hoisting the bucket and the drum 17 taking up the slack of the cable 19. When the bucket has been moved to dumping position the drum 17 is again locked against movement and the drum 18 released. The weight of the load will then cause the shaft 11 and the differential drum 14 to move downward relatively to the supporting member, thereby opening the jaws and dumping the load. In Fig. 1 we have also shown the device as provided with what is known as a tag line 27 which holds the bucket against rotary movement. This consists merely of a cable secured at one end to the bucket and passing about guides 28 and 29 on the boom and connected to a counterweight 30 slidably mounted on the boom. This counterweight permits the line 27 to pay out or take up the same as the bucket is hoisted or lowered, but always maintains the line taut and prevents the bucket from rotating about a vertical axis.

In Fig. 3 we have shown the mechanism as applied to an excavating machine of a slightly different type and have shown the drums as mounted on separate shafts. The drum 31, which actuates the hoisting and closing cable, is loosely mounted on a shaft 32 which is actuated by a gear 33, this gear being connected with the drum by friction clutch mechanism 34 similar to that above described. The dumping and lowering drum 35 is loosely mounted on a shaft 36 journaled in bearings carried by a bracket 37 mounted on the forward portion of the frame 1 of the excavating machine. This drum is actuated by a gear 38 rigidly secured to the shaft and meshing with the gear 33 of the hoisting drum. The drum 35 is also provided with a brake mechanism 39 similar to that above described. The control and operation of the drum are substantially the same as that described in connection with the form of the attachment shown in Figs. 1 and 2. The boom hoisting drum is here shown at 40 and is mounted on a separate shaft 41 connected by a suitable gearing with the hoisting drum and is actuated by the hoisting engine.

The operation of the device has been fully described in connection with the description of the several parts thereof and it will be apparent that we have provided an attachment by means of which an ordinary excavating machine of the steam shovel type can be readily adapted for use with excavating buckets of the clam shell type; and that this attachment is of such a character that it can be readily applied to the steam shovel with a minimum amount of alteration of the latter.

While we have shown two forms of the attachment it will be understood that these are chosen for the purpose of illustration only and that we do not desire to be limited to the details of construction shown and described, for obvious modifications will occur to a person skilled in the art.

Having thus fully described our inven- tion, what we claim as new and desire to secure by Letters Patent, is:—

1. The combination, with a steam shovel comprising a main supporting frame, a boom movably mounted on said frame, and a clam-shell bucket having operable parts, of a supplemental frame removably and independently mounted on said main frame, a plurality of drums mounted on said supplemental frame, cables connecting two of said drums to said bucket to raise and lower the same and to manipulate its operable parts, another cable connecting another of said drums with said boom to actuate the latter, a single actuating device for said drums, and means to separately control said drums to cause the desired movement to be imparted to said clam-shell bucket.

2. The combination, with a steam shovel comprising a main supporting frame, a boom mounted on said main frame, a clam-shell bucket having operable parts, and cables extending over said boom and connected with said bucket to support and operate the latter, of a transverse shaft removably and independently mounted on said frame, two drums mounted on said shaft, having the respective cables wound about the same, and means to cause said drums to rotate separately or simultaneously and to hold either or both of said drums against rotation.

In testimony whereof, we affix our signatures in presence of two witnesses.

CHAS. B. KING.
CLARENCE B. WESTON.

Witnesses:
C. W. WRIGHT,
HARRY L. COX.